V. A. H. KAHLER.
SPRAY SPRINKLER.
APPLICATION FILED FEB. 8, 1921.
1,415,452.
Patented May 9, 1922.
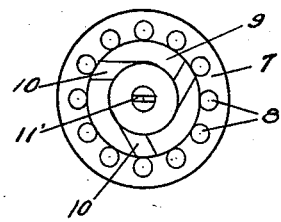
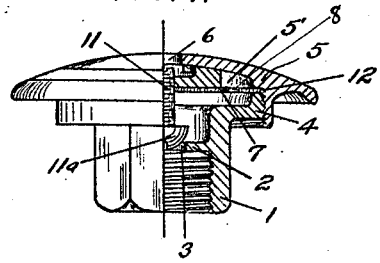
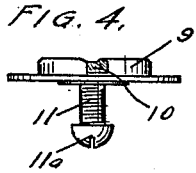
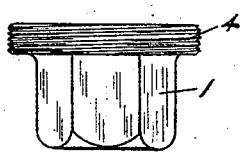
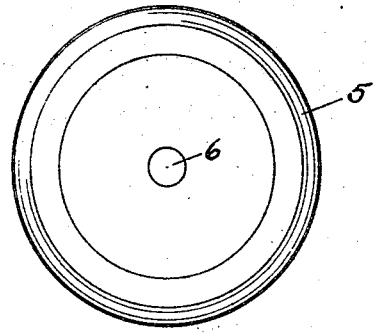
INVENTOR.
ATTORNEYS.

UNITED STATES PATENT OFFICE.

VENICE A. H. KAHLER, OF PASADENA, CALIFORNIA.

SPRAY SPRINKLER.

1,415,452. Specification of Letters Patent. Patented May 9, 1922.

Application filed February 8, 1921. Serial No. 443,375.

*To all whom it may concern:*

Be it known that I, VENICE A. H. KAHLER, a citizen of the United States, residing in the city of Pasadena, county of Los Angeles, and State of California, have invented certain new and useful Improvements in Spray Sprinklers, of which the following is a specification.

My invention relates to spray sprinklers of the character adapted to be connected to the end of a water supply pipe for the purpose of discharging the water over a surrounding area in the form of a spray, somewhat similar to that shown in my United States Patent No. 1,339,349.

The principal object of this invention is to provide an improved sprinkler capable of throwing a general spray over the entire surrounding area, and to provide certain improved features of construction, whereby to simplify the construction and provide a sprinkler suitable for private lawns of less area and where less water and less pressure are needed.

In order to illustrate my improved sprinkler, I have shown the same in the accompanying drawings, in which,—

Figure 1 is a side elevation of the complete sprinkler, with a part shown in section;

Figure 2 is a top plan view of the entire sprinkler;

Figure 3 is a top plan view of a combination disc and channel member;

Figure 4 is a side elevation of the same; and

Figure 5 is a side elevation of the lower part of the sprinkler.

Referring to the drawings more in detail, my improved sprinkler as here shown comprises an internally threaded member, 1, provided with an interior floor or partition member 2, with a central opening 3 therein, as indicated in Fig. 1. Said member also has an enlarged flange-like portion, 4, externally threaded and adapted to receive the top or cap, 5, in the manner clearly indicated in Fig. 1. Said top has a smooth concaved dome-like chamber 5′ therein, with a central opening 6 therein, as indicated. Referring now to Figs. 1, 3 and 4, a combination disc and channel member is provided to be clamped between the members 1 and 5. This disc comprises a disc portion, 7, provided around its edge with a series of holes, 8, with a thicker annular central part, 9, forming a ring, provided with inlet channels 10, cut in said annular or ring portion 9, as clearly indicated in Figs. 3 and 4. These channels 10, taper upwardly from the outside of the ring portion 9 to the inside thereof, as will be understood from the shading in Fig. 4. A screw member 11 is threaded through the center of said disc member 7, with its upper or smaller end slotted crosswise, as at 11′, to receive a screw driver, and its head, 11ᵃ is so positioned and is of such size as to fit into the opening 3, in the member 2, and thus operate, when screwed down into the same to close said opening and shut off the inlet to the chamber above the floor or partition member 2, as will be clearly understood from Fig. 1.

The water enters through the opening 3, in the floor 2, to the chamber in the upper part of the member 1, and below the disc 7. It then finds its way through the holes 8, in the disc 7 and fills the space above the disc and around the outside of the annular member 9, being forced through the channels 10, to the space above the disc and in the middle portion of the annular member 9, with a whirling action by reason of the tangential arrangement of said channels, and is then discharged with a whirling action out through the central outlet opening 6, in the top or cap 5, being thrown in all directions, in a uniform manner, over all the surrounding area. The disc member is firmly clamped between the lower member 1 and the top member 5, as clearly seen at 12, Fig. 1.

What I claim and desire to protect by Letters Patent is,—

A spray lawn sprinkler of the character shown and described comprising in combination a body internally threaded at one end, having a floor or partition member with central opening therein and having its opposite end of larger internal diameter and externally threaded, a top cap internally threaded and adapted to screw on to the larger externally threaded portion of said body and having a central opening, a disc member of a diameter corresponding to the diameter of the larger part of said body and adapted to be clamped between the edge thereof and said top cap, said disc member having a series of holes therethrough adjacent its outer edge and having a central portion on its upper side of thicker construction and provided with a plurality of tangentially disposed openings extending from the holes through the outer edge of the disc to the central part of said thicker part, and a screw valve member threaded through said disc portion and having its end adapted to seat in the central opening in the floor or partition member, whereby to cut off communication through said opening.

Signed at Pasadena, county of Los Angeles, and State of California, this 2nd day of February, 1921.

VENICE A. H. KAHLER.

In presence of—
IRA J. H. SYKES,
W. R. LITZENBERG.